UNITED STATES PATENT OFFICE.

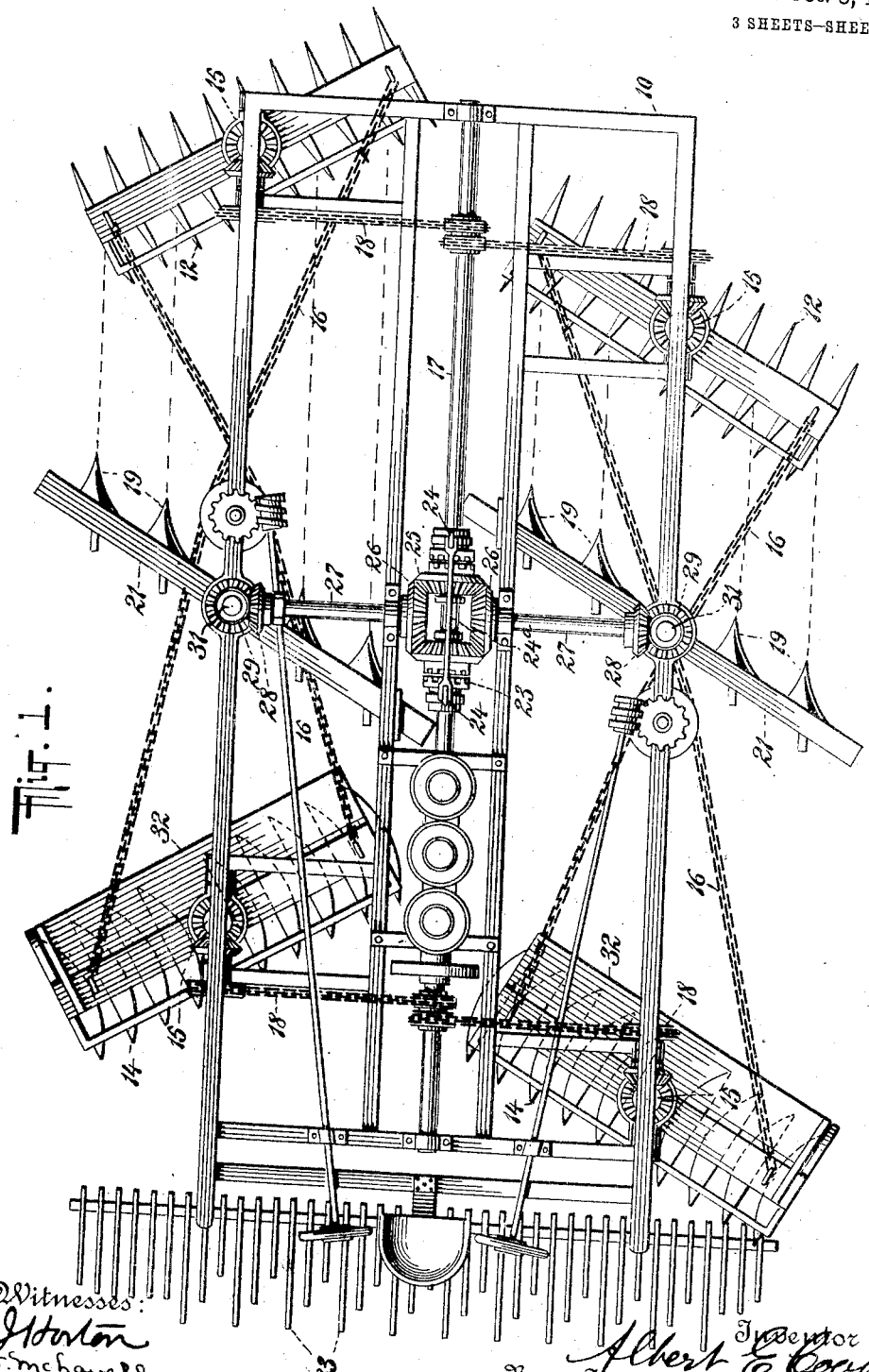

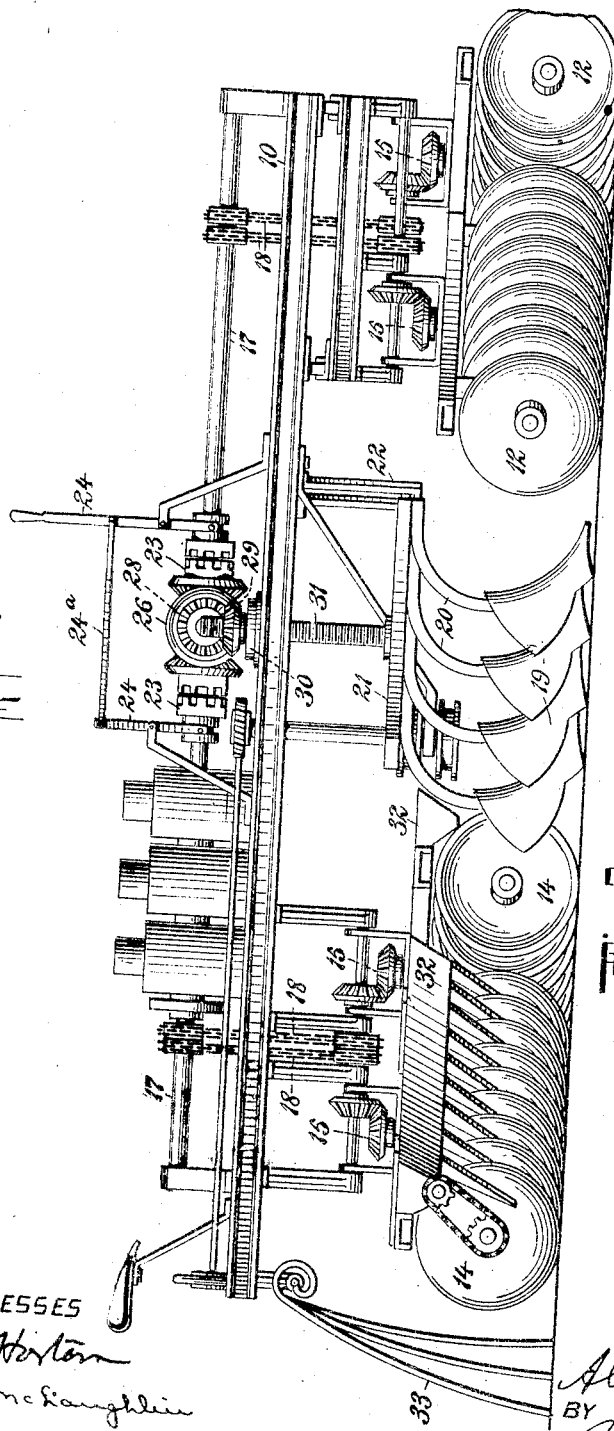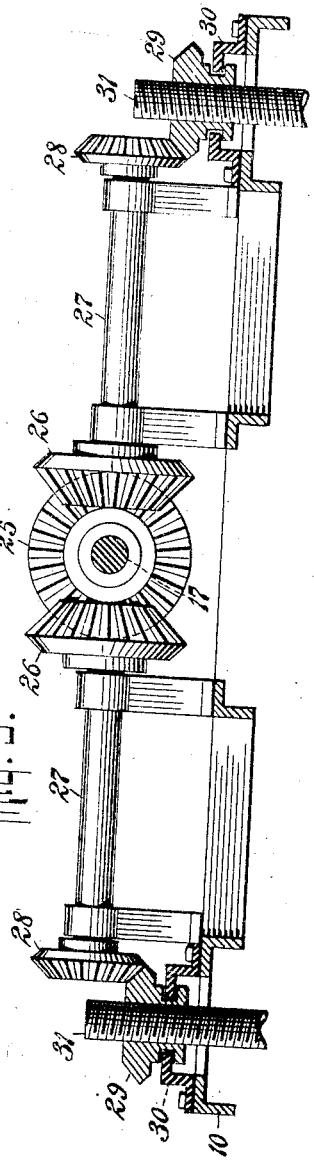

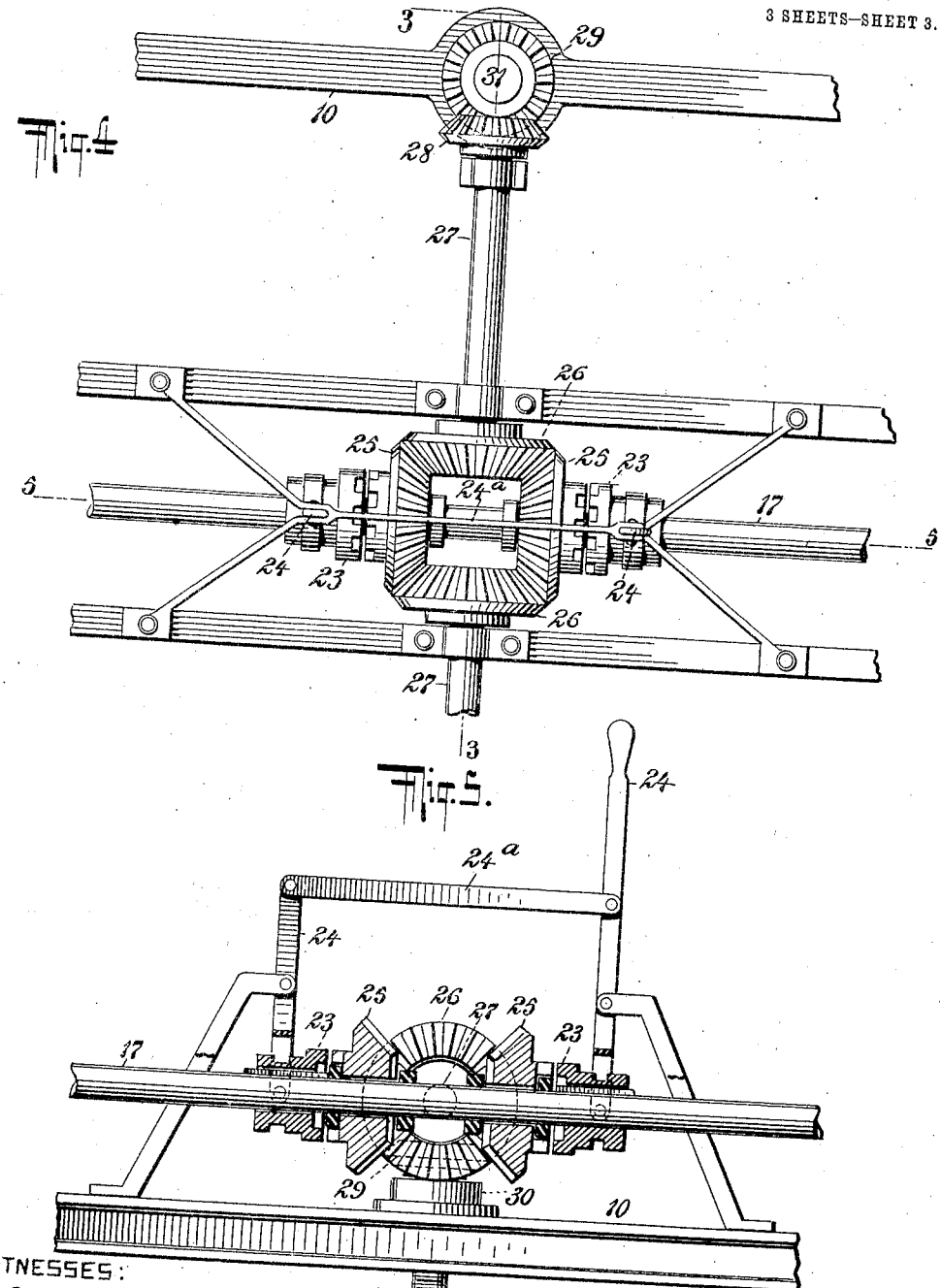

ALBERT E. COOK, OF ODEBOLT, IOWA.

MOTOR-PLOW.

1,040,890. Specification of Letters Patent. Patented Oct. 8, 1912.

Application filed January 24, 1908, Serial No. 412,408. Renewed March 2, 1912. Serial No. 681,173.

*To all whom it may concern:*

Be it known that I, ALBERT E. COOK, of the city of Odebolt, county of Sac, and State of Iowa, have invented certain new and useful Improvements in Motor-Plows, of which the following is a full, clear, and exact specification, such as will enable others skilled in the art to which it appertains to make and use the same.

The object of my invention is to provide an organized apparatus which will, by a single movement over the ground, perform all the operations necessary to the complete cultivation of the soil, so that, for example, seeding and harrowing attachments may be applied to the machine, as parts thereof, and by a single operation of the machine over sodded or stubble ground, the sod or stubble will be sliced or cut, the ground will be plowed in furrows, the furrowed ground cultivated, the seed planted in the cultivated ground and the seeded ground harrowed, thus completing in every part, the work necessary to the cultivation and seeding of the soil, leaving the next operation only the growing of the crop and its subsequent harvesting. The advantage of this will be obvious. In attaining this end, I provide a frame on which a motor or other source of power is mounted. The frame is supported on the ground by gangs of rotary disks or equivalent devices, arranged respectively at the front and rear of the frame and one or more, preferably all, of these disks are geared with the motor to be positively driven thereby, the disks being so arranged that they exert a combined propelling and cultivating action, sending the machine forward and simultaneously cultivating the soil. Between these gangs of disks are arranged one or more plows, which are supported on the frame and drawn through the ground with the same. These plows are arranged to be raised and lowered to control their operation and preferably this is effected by clutch and gear mechanism driven from the motor. At the rear set of disks may be and preferably is arranged a seeder mechanism and harrow teeth. In an apparatus thus constituted, the front gang of disks cuts or slices the sod or stubble, and the plows follow and turn the soil. This is followed by the rear gang of disks which cultivate the plowed ground and thereupon the seeders and harrows operate to seed and harrow the soil.

My invention involves other features of importance all of which will be fully set forth hereinafter and particularly pointed out in the claims.

Reference is had to the accompanying drawings, which illustrate, as an example, one manner in which the various elements may be embodied, in which drawings, Figure 1 is a plan view of an apparatus embodying the preferred or most complete form of my invention; Fig. 2 is a side elevation thereof; Fig. 3 is a detail sectional elevation showing the gearing for raising and lowering the plows; and Figs. 4 and 5 are respectively plan and sectional elevations of the clutch mechanism for operating the gearing shown in Fig. 3.

10 indicates the frame which may be of any desired construction and on which the motor or engine 11, also of any desired form, is mounted. At the front of the frame, according to the structure shown in the drawings, are arranged two gangs of disks 12 set at an oblique angle to each other, and at the rear of the frame, two similar gangs 14 are arranged. These gangs of disks 12 and 14 may be arranged and operated in any desired manner. For example, substantially as shown in the prior patent to Cook and Kurtz, No. 789,528, granted May 9, 1905; and such general arrangement is illustrated in the drawings, where 15 indicates the vertical centers around which the gangs are adjustable to control the operation of the disks and steer the plow, and 16 indicates the chains or cables and drums by which this adjustment is effected. I desire it understood, however, that my invention is not limited to this particular arrangement. The shaft 17 of the motor runs longitudinally of the frame and is connected at its ends with the respective gangs of disks by gearing 18 which may also be the same as in the prior patent referred to or of any other suitable nature. In this manner the gangs of disks are driven positively from the motor and serve not only to cut the sod or stubble and cultivate the ground, but also as the sole propelling means of the plow.

Arranged below the frame, intermediate its ends, and between the front and rear gangs of disks are a number of plow shares 19. These are preferably arranged in two oblique gangs, the members of each of which have their beams 20 secured to bars 21 which are vertically adjustable with the plows in guides 22 depending from the frame 10. By thus raising or lowering the bars 21, the plows may be engaged with or disengaged from the ground. This enables the apparatus to be readily adjusted so that the plows may be lowered into operation or raised to allow the apparatus to transport itself from point to point or to allow the disks to operate in the soil to the exclusion of the plows. This varied operation of the disks is controlled by their obliquity to the line of movement of the apparatus, their cultivating action decreasing as they are moved toward planes parallel to the line of movement, until when parallel to such line of movement, the disks operate as wheels only, and the apparatus propels itself over the ground with no cultivating action.

For raising and lowering the plows 19 in the manner set forth, I employ, by preference, the power of the engine derived from the shaft 17 and controlled and applied by a suitable gear all of which will now be described. On the shaft 17 are splined alternately acting clutch collars 23 connected with levers 24. Of these levers 24, one is a hand lever and is cross-connected by a link 24ª with the other. Coacting with the clutch collars 23 are miter gears 25 which are held loosely on the shaft and have clutch teeth adapted to inter-engage with those on the clutch collars. The miter gears 25 are in mesh with two similar gears 26 which are respectively fast on shaft sections 27 rotatably mounted transversely on the frame 10. The shaft sections 27 carry at their outer ends miter gears 28 which are meshed with gears 29 held to rotate in boxes 30 mounted on the frame 10 and engaged with the hubs of the gears so that they may rotate freely, but will be incapable of axial motion. The gears 29 are centrally bored and internally threaded to serve as nuts and operate as such on screw shafts 31 attached rigidly to the bars 21 and rising therefrom through openings in the frame 10. By operating the levers 24, the gears 25 may be driven at will from the shaft 17, thus driving the elements 26, 27, 28 and 29 and, from the operation of these latter, causing the screw shafts 31 to move up or down. It will be seen in this connection that the direction of movement of the screws 31 and their connections is determined by the direction of motion of the levers 24, motion in one direction throwing one clutch in action and rotating the gears 26 in one direction and motion of the levers in the other direction reversing this action. To compensate for the opposite directions of rotation of the gears 26 and their connections, the shafts 31 are right and left threaded, thereby insuring that the two gangs of plows 19 are simultaneously raised or lowered.

Adjacent to the gangs of disks 14 are arranged seeder devices 32. These may be of any desired construction and are arranged to plant the seed in the furrows rearward of the disks 14. Behind these seeder devices are arranged harrow teeth 33, which after the seed is planted, harrow the soil and leave the same ready for the seed to sprout and grow without further cultivation.

In the operation of the apparatus, the gangs of disks working along relatively oblique axes exert a propelling force tending to send the plow straight ahead. The plowing action, and the direction of motion of the plow, may be controlled by changing the angularity of the disk gangs, suitable mechanisms being provided for this purpose, as will be understood from the prior patent mentioned. As the apparatus moves over the ground, the front disks cut or slice the sod, stubble, etc. and are followed by the plows which turn the sod. The specific form of the plows is immaterial. They are here shown as of the land side and mold board type, but may be of the disk type if desired. The rear disks following the plows, cultivate the soil, breaking it up and leaving it ready for the reception of the seed. This is drilled into the ground by the seeder devices and following this the ground is harrowed by the spring teeth. Thus, by a single mechanism, and a single operation, the entire work of cultivation is effected, excepting, of course, the harvesting of the crop. It is to be noted in this connection that the plowing means by their natural action exert a downward "suction" or draft on the entire apparatus, drawing the disks or other supporting and propelling means firmly against the ground. This downward draft engages the propelling means firmly with the earth and supplies the traction, at the same time allowing the machine to be lightly constructed without depending upon its weight for its traction. This feature is of great importance since it admits of the use of a minimum of material and the expenditure of a minimum of energy in accomplishing the result in hand, that is to say, it requires less power to propel a lightly constructed apparatus than one more heavily constructed. In this operation the weight of the earth on the plowing means is an important factor in resisting the upward tendency of the machine due to the thrust of the propelling and supporting means against the earth.

Having thus described my invention, what I claim as new and desire to secure by Letters Patent of the United States is:

1. In a motor driven cultivating apparatus, the combination of a frame, means on the frame at its front portion to cut the sod, plowing means on the frame behind the said cutting means to turn the said sod in furrows, cultivating and pulverizing means at the rear portion of the frame, said sod cutting means and cultivating and pulverizing means bearing continuously on the ground to sustain the apparatus and a motor mounted on the frame and geared with said cultivating and pulverizing means to drive them positively whereby such means exert a combined propelling and cultivating action.

2. In a motor driven cultivating apparatus, the combination of a frame, disks on the frame at the front portion thereof to cut the sod, plowing means on the frame behind the sod cutting means to turn the sod in furrows, cultivating disks mounted on the frame behind the plowing means to cultivate the plowed soil, said disks bearing continuously on the ground to sustain the apparatus, and a motor mounted on the frame and geared with certain of said disks to rotate them positively, whereby such disks exert a combined plowing and propelling effect.

3. In a motor driven cultivating apparatus, the combination of a frame, two gangs of disks mounted on the frame respectively at the front and rear portions thereof, a motor mounted on the frame and geared with said disks to rotate them positively, whereby said disks serve to propel the apparatus and the forward gang of disks serves to cut the sod while the rearward gang serves to cultivate the soil, and a plowing means mounted on the frame intermediate said gangs of disks to turn the sod in furrows after the operation of the forward gang of disks.

4. In a motor driven cultivating apparatus, the combination of a frame, two gangs of disks mounted on the frame respectively at the front and rear portions thereof, a motor mounted on the frame and geared with said disks to rotate them positively, whereby said disks serve to propel the apparatus and the forward gang of disks serves to cut the sod while the rearward gang serves to cultivate the soil, a plowing means mounted on the frame intermediate said gangs of disks to turn the sod in furrows after the operation of the forward gang of disks, and means for raising and lowering said plowing means independently of the disks.

5. In a motor driven cultivating apparatus, the combination of a frame, means on the frame at its front portion to cut the sod, plowing means on the frame behind the sod cutting means to turn the sod in furrows, cultivating disks at the rear portion of the frame arranged in gangs oblique to each other, a motor mounted on the frame and geared with said cultivating disks to rotate them positively, whereby the disks exert a combined propelling and cultivating action, and means for raising and lowering the plowing means.

6. In a motor driven cultivating apparatus, the combination of a frame, means on the frame at its front portion to cut the sod, plowing means on the frame behind the sod cutting means to turn the sod in furrows, cultivating disks at the rear portion of the frame arranged in gangs oblique to each other, a motor mounted on the frame and geared with said cultivating disks to rotate them positively, whereby the disks exert a combined propelling and cultivating action, and means geared with the engine for raising and lowering said plowing means.

7. A motor driven cultivating apparatus, comprising a frame, means at the front portion thereof for cutting the sod, a plowing means following the cutting means to turn the soil in furrows, means connected to the frame for cultivating the plowed ground, a motor for propelling the apparatus and devices connected with the motor by which the plowing means may be raised or lowered independently of the sod cutting and cultivating means, whereby such means bear on the ground at all times to support the apparatus.

8. A motor driven cultivating apparatus, comprising a frame, means at the front portion thereof for cutting the sod, a plowing means following the cutting means to turn the soil in furrows, means connected to the frame for cultivating the plowed ground, a motor for propelling the apparatus, and devices including a clutch controlled gearing connected with the motor by which the plowing means may be raised or lowered independently of the sod cutting and cultivating means, whereby such means bear on the ground at all times to support the apparatus.

9. In a motor driven plow the combination of a frame, a motor mounted thereon and carried thereby, groups of combined propelling and cultivating means carrying the frame and continuously engaging the earth to sustain the apparatus in addition to cultivating and propelling and a plowing means mounted on the frame independently of said cultivating and propelling means and at a point intermediate said groups thereof, said plowing means having a surface or surfaces inclined to the horizontal and adapted to enter the earth whereby the plowing means exerts a downward pull on the frame firmly engaging the said supporting and propelling means with the earth.

10. In a motor driven plow the combination of a frame, a motor mounted thereon and carried thereby, groups of combined propelling and cultivating means carrying the frame and continuously engaging the earth to sustain the apparatus in addition to cultivating and propelling and a plowing means mounted on the frame independently of said cultivating and propelling means and at a point intermediate said groups thereof, and means for raising and lowering said plowing means in and out of the earth independently of the said supporting and propelling means.

In testimony whereof I have signed my name to this specification in the presence of two subscribing witnesses.

ALBERT E. COOK.

Witnesses:
  ISAAC B. OWENS,
  E. I. McLAUGHLIN.